United States Patent
Paulus et al.

[15] 3,699,349
[45] Oct. 17, 1972

[54] ARRANGEMENT FOR DETERMINING FRAME LENGTHS ON FILM STRIPS

[72] Inventors: Rudolf Paulus; Hans-Peter Huber, both of Munich, Germany

[73] Assignee: Agfa-Gevaert Aktiengesellschaft, Leverkusen, Germany

[22] Filed: Oct. 16, 1970

[21] Appl. No.: 81,347

[30] Foreign Application Priority Data

Oct. 22, 1969 Germany..........P 19 53 014.4

[52] U.S. Cl.................250/219 FR, 355/68, 250/209
[51] Int. Cl..............................................G01b 7/04
[58] Field of Search......250/219 D, 219 LG, 219 FR, 250/209; 355/68, 111; 356/202, 203; 235/92, 61.11 E

[56] References Cited

UNITED STATES PATENTS

| | | |
|---|---|---|
| 3,299,272 | 1/1967 | Furukawa et al. ......250/219 D |
| 3,559,253 | 2/1971 | Pandell et al........250/219 LG |
| 1,348,566 | 8/1920 | Jenkins............250/219 FR X |
| 3,428,817 | 2/1969 | Hofmeister et al..250/219 LG |
| 3,518,440 | 6/1970 | Hanson et al..........250/219 D |

*Primary Examiner*—Walter Stolwein
*Attorney*—Michael S. Striker

[57] ABSTRACT

One or more photoresistors, arranged to detect light passing through the film strip, cause varying signal voltages, the maximum voltages of which are stored and compared with the instantaneous signal voltages to produce a signal corresponding to the format of the film just examined.

18 Claims, 4 Drawing Figures

INVENTOR
RUDOLF PAULUS
HANS-PETER HUBER

INVENTOR
RUDOLF PAULUS
HANS-PETER HUBER

ARRANGEMENT FOR DETERMINING FRAME LENGTHS ON FILM STRIPS

BACKGROUND OF THE INVENTION

The invention relates to an arrangement for determining the frame length present on a length of film composed of film strips having frame lengths that can change from film strip to film strip.

It has become more and more the practice to splice together the film strip into a long length, which is rolled up, and then to print the negatives in a roll film printer at high speed. Particularly high printing speeds are possible when very printable negative has at the margin of the film a notch that is in determined spatial relationship to the negative. It is particularly advantageous to splice together the film strips before they are developed, because the entire length of the spliced strips can be inexpensively developed in continuous developers. However, with 35 mm film, perforated along both edges, several formates are possible: 24 × 36, 24 × 24, and 18 × 24 millimeters. When the film is undeveloped, it is impossible to determine of which format the negatives are. Consequently, it is possible that the developed length of spliced film strips, which is to be printed, contains more than one format. Up to the present time, it has been the practice to cut out all those negatives not having the most common format (24 × 36) and to print these separately, although the necessary cutting and splicing are in themselves expensive and time consuming.

Automatic film notches have been introduced to make format indicating marginal notches for the printable negatives using photoelectric scanning, these automatic notchers determine the positions of the frame lines between successive negatives. The position of the frame lines cannot be determined, however, unless the automatic notcher has available to it information as to the frame length.

SUMMARY OF THE INVENTION

An object of the present invention is an arrangement for determining the frame length of films in an automatic processing line for exposed film.

The arrangement of the invention consists essentially of means for advancing the film along a predetermined film path, at least one elongated light source arranged on one side of and aligned with the film path and extending transversely thereto, the light source having a width no greater than that of the narrowest frame line, said frame line comprising the transparent spacing between adjacent frames, phototransducer means, such a photoresistors, arranged on the other side of the film path opposite the light source for transforming light passing through the frame lines into corresponding frame line voltages, and electric evaluation means controlled by the frame line voltages for determining the frame length on the film strip in dependence on the frame line voltages.

The arrangement of the invention can be placed in the processing line in front of the automatic notcher, and the format information obtained by the arrangement sent to the notcher. When the arrangement of the invention is not used in a processing line, or is used to control a printer, a detectable format indicating mark can also be made at the beginning of each film strip.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
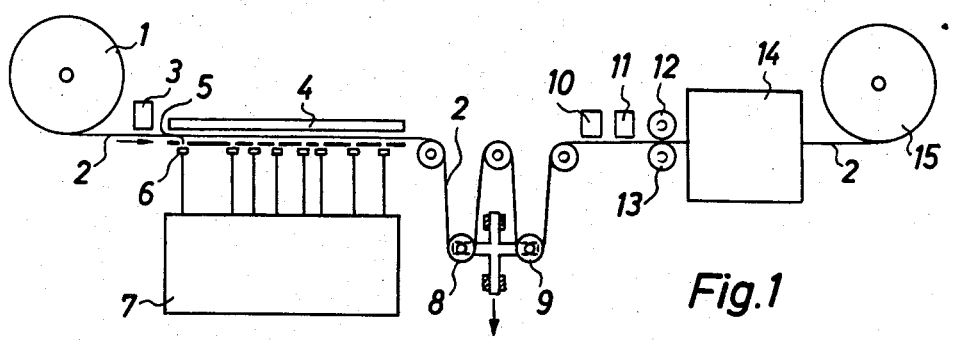
FIG. 1 is a schematic representation of the arrangement of the invention in an automatic processing line.

With reference to FIG. 1, a spool 1 was wound upon it a length of film 2 consisting of a large number of individual film strips spliced together. It is assumed that the frame format can vary from film strip to film strip, since the strips are spliced together before they are developed. The film unwound from the spool 1 passes, first of all, by an arrangement 3, which detects the splices between successive film strips, whether by means of a marginal notch, or by the change in thickness of the film, at the splice. The film 2 subsequently passes along an extended length of the path illuminated by a lamp 4. Positioned opposite the light source 4, and extending transversely to the direction of movement of the film is a light admitting aperture 5, the width of which is not greater, and preferably is less, than the width of the narrowest frame line. The apertures 5 serve as the apparent light sources. Phototransducers 6 are positioned underneath, and aligned with, the apertures 5. Depending upon the design of the associated electrical circuitry, a smaller or larger number of apertures and phototransducers is required. The phototransducer can be a photomultiplier, a photoelectric cell, a photoresistor, a photodiode, and the like. In the embodiments to be described, photoresistors are used for the sake of simplicity. Connected to the phototransducers is an evaluation circuit the exact design of which depends upon the transducer used.

A slack compensator, having movable guide rollers 8 and 9 is positioned after the illuminated path to take up and store the length, however long, of a film strip. After advancing through the slack compensator, the film passes by a second splice detector 10, as well as by a format marker 11, which makes upon the edge of the film a mark corresponding to the frame length of that film strip. Two film drive rollers 12 and 13, which positively engage the film 2, are sparked by the splice detector 10 and started up by the splice detector 3. Finally, the film passes through an automatic notcher 14, which is only shown schematically and is completely described in the German Pat. No. 1,285,317. After moving through the automatic notcher, the film 2, provided with notches in a determined relationship with those frames that can be printed, is wound up on a spool 15. A film 2, after having passed through the apparatus shown in FIG. 1, can then be automatically printed using a suitably designed printer, without adjusting for different formats as they appear on the spliced film 2.

Figure 2:
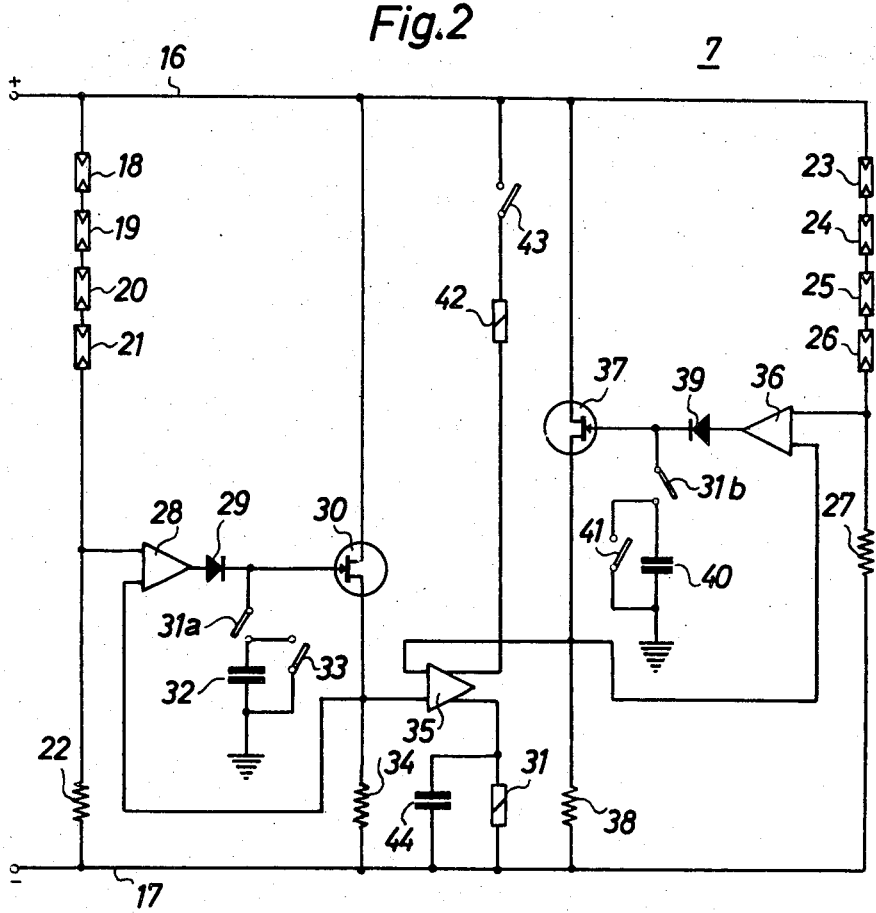
FIG. 2 is a circuit diagram of a first embodiment of the invention.

FIG. 2 shows an evaluation circuit for use with the apparatus shown in FIG. 1. Allthough as a rule three different formats will appear on the film 2, the evaluation circuits described distinguish between only two formats. The circuits are therefore simplified and made more easily understandable. The circuits of the invention, however, are easily altered to distinguish between three and more formats, and the invention specifically covers circuits based upon those now to be described that distinguish between more than two formats.

Connected between the positive and negative lines 16 and 17, is a voltage divider consisting of four photoresistors 18, 19, 20, and 21, as well as a fixed resistor 22. The photoresistors 18 to 21 are aligned with respective aperatures 5 along the film path illuminated by the lamp 4, with a spacing of 36 millimeters between successive photoresistors. When the frame format is 24 × 36 millimeters, a frame line is in registry with each of these photoresistors; and the resulting voltage at the junction between the series connected photoresistors and the resistor 22 will be indicative of the high degree of transparency of the frame line.

The light part of the circuit also has a voltage divider, consisting of four series connected photoresistors 23, 24, 25, and 26, as well as a fixed resistor 27. These photoresistors are aligned with respective aperatures 5 along the film path illuminated by the lamp 4, with a spacing of 24 millimeters between successive photoresistors. When the frame format is 24 × 24 millimeters, a frame line is in registry with each of these photoresistors; and the resulting voltage at the junction between the series connected photoresistors and the resistor 27 will have its maximum positive value. It is not essential that the photoresistors for the different formats have specific spacial relationship with respect to each other; it is only essential that the illumination is uniform along the entire path of photoresistors.

One input of an operational amplifier 28 is connected to the junction between the photoresistor 21 and the fixed resistor 22, the output of this amplifier being connected by a diode 29 to the gate of a field effect transistor 30. A normally open contact 31a of a relay 31 is connected between the cathode of the diode 29 and one plate of a capacitor 32, the other plate of which is connected to ground. A normally open switch 33, controlled by the splice detector 3, is shunted across the capacitor 32 to short the latter when closed.

The field effect transistor 30, which acts as an impedance transformer, is connected to the positive line 16 and through a load resistor 34 to the negative line 17. The second input of the operational amplifier 28 is connected to the junction between the load resistor 34 and the field effect transistor 30.

The first input of a further operational amplifier 35 is connected to the same junction, the other input being connected to a circuit for evaluating the voltage at the junction between the photoresistor 26 and the fixed resistor 27, this circuit being the same in design as that just described for evaluating the voltage at the junction between the photoresistor 21 and the fixed resistor 22. One input of the operational amplifier 36 is connected to the junction between the photoresistor 26 and the resistor 27, and the other input is connected to the junction between the field effect transistor 37 and the resistor 38. The output of the operational amplifier 36 is connected to a diode, the cathode of which is connected to the gate of the field effect transistor 37. A normally open contact 31b of the relay 31 is connected between the cathode of this diode and one plate of a capacitor 40, the other plate of which is connected to ground. This capacitor is shunted by a normally open switch 41 controlled by the splice detector 3. The operational amplifier 35, which operates as a comparator circuit, has two outputs, one of which is connected through a relay 42 through a switch 43 operated by the splicers of the film strips, and the other of which is connected to a relay 31 shunted by a capacitor 44.

The circuit just described operates in the following manner. The film 2 is unrolled from the spool 1 and advanced along the film path illuminated by the lamp 4. The photoresistors 18 to 21 and 23 to 26 are more or less brightly illuminated, depending upon the transparency of the exposed and developed film. The series connection of each group of photoresistors ensures that all photoresistors of a group contribute equally to the voltage appearing at the one input of the operational amplifiers 28 and 36. If the average spacing between the highly transparent frame lines corresponds to the spacing between the photoresistors of a group, the associated operational amplifiers —28 or 36 as the case may be— receive a voltage that is appreciably more positive than is otherwise the case.

In FIG. 2 it has been assumed that relay 31 is not energized and that the switches controlled by the film strip splicers have not been actuated. Consequently, a signal is conducted immediately through the diodes 29 and 39 to the gates of the respective field effect transistors 30 and 37. The voltages appearing at the outputs of the operational amplifiers 28 and 36 are not stored by the capacitors 32 and 40 as long as the relay 31 is not energized. The voltage appearing at the output of the operational amplifier 28 is connected through the field effect transistor 30 to the second input of this operational amplifier. The operational amplifier 28 (or 36) is so designed that when the relay 31 is energized, the capacitor 32 (or 40) charges until the voltages at the two inputs of the operational amplifier 28 (or 36) are equal. The junction between the field effect transistor 30 and the resistor 34, on the one hand, and that between the field effect transistor 37 and the resistor 38, on the other hand, enable a low impedance comparison between the voltages on the capacitors 32 and 40. This comparison is made by the operational amplifier 35.

It sometimes occurs that a length at the beginning of a film strip is unexposed, so that at the very beginning there is delivered to each of the operational amplifiers 28 and 36 a maximum voltage which cannot be exceeded when the frame lines of the succeeding portion of the film strip pass by the photoresistors of the group corresponding to the format of the film strip. Since both capacitors 32 and 40 store the same maximum voltage, it is impossible to determine, at the end of the film strip, the frame length. To avoid this ambiguity, the operational amplifier 35 has a further function. If the voltages at its two inputs are equal, this means that there is a uniformly transparent length of film along the illuminated film path. Since the two equal signals delivered in this case prevent determination of the frame length, the relay 31 is connected to an output of the amplifier 35, which has no voltage when the two inputs are at equal voltages. The relay 31 remains unenergized and the two contacts 31a and 31b remain open, so that the capacitors 32 and 40 cannot be charged, thereby preventing two equal input voltages from interfering with the determination of the frame length of a film strip. If, however, the two input voltages on the operational amplifier 35 are not equal, the relay 31 is energized, but only closes its contacts 31a and 31b after a certain time delay, because of the parallel-connected capacitor 44. This delay is of such a length that with steady advance of the film, the end of the uniformly darkened length of film reaches the end of the series of photoresistors. The two contacts 31a and 31b then close, and the capacitors 32 and 40 charge to the maximum voltages appearing at the outputs of the respective operational amplifiers 28 and 36.

If the film 2 is now advanced until the next splice reaches the illuminated film path, there will be stored in each of the capacitors 32 and 40 the maximum voltage that can occur between the two splices of the film strip from each group of photoresistors. These two maximum voltage values are then compared by the operational amplifier 35 to produce an answer as to which format is present in the film strip that has just passed through the illuminated film path. The comparator 35 can be so designed that, when the voltage across the capacitor 40 is greater than that of the capacitor 32, the voltage at the comparator output connected to the relay 42 is sufficient to cause, when the switch 43 is closed, the relay 42 to be energized. In this way, the unit 11, for example, can be caused to make a format mark on the beginning of the film strip. On the other hand, if the voltage across the capacitor 32 is greater, the relay 42 is not energized. The fact that no format mark appears at the beginning of the film strip means that the most common kind of format (24 × 36 millimeters) appears on the strip. The energization of the relay 42 can also be used to set the automatic notcher 14 to the less common format 24 × 24 millimeters. At the same time, the splice detector 3 causes the splice detector 10 to release the film drive rollers 12 and 13, whereby the film strip held in the slack compensator 8 and 9 can be drawn through the automatic notcher 14.

If a uniformly transparent length appears near the end of a film strip, the voltages across the capacitors 32 and 40 will not appear at the respective inputs of the amplifier 35, since the relay 31 is not energized. When switch 43 is closed, relay 42 will not be energized even if it should be. In this case, the relay 42 is controlled by a further comparator arrangement, which receives the voltages across the capacitors 32 and 40 directly, by bypassing the contacts 31a and 31b.

At the same time that the splice detector 3 is operated by a splice, the contacts 33 and 41 are closed, thereby discharging the capacitors 32 and 40 for the next film strip. This form of the invention requires only three apertures, a photoresistor 45 being aligned with the first aperture. The other two apertures are spaced from the first aperture distances respectively equal to the possible frame length, the aperture associated with the photoresistor 46 being spaced 36 millimeters and that associated with the photoresistor 47 being spaced 24 millimeters. It will be understood that for each additional format to be determined, an extra aperture and photoresistor, appropriately spaced, is added. These photoresistors form voltage dividers with the respective fixed resistors 48, 49 and 50 and 51. The resistor 48 has an appreciably smaller resistance than the resistor 49, and the junction 58 between these two resistors is connected to one input of an operational amplifier 53, which operates as a store. A diode 55, shunted by a normally open splice switch 54, connects the output of the amplifier 53 to one plate of a storage capacitor 56 and to the gate of a field effect transistor 57. The output of the field effect transistor is connected to the second input of the operational amplifier 53. The junction between the photoresistor 45 and the resistor 48 is connected to one input of an operational amplifier 59, which functions as a comparator. The other input of the comparator 59 is connected through the field effect transistor 57 to the storage capacitor 56. The output of the amplifier 59 is connected to a relay 60.

The junction 61 and 62 of the voltage dividers 46, 50 and 47, 51 are connected through the normally open contacts 60a and 60b of the relay 60 to respective operational amplifiers 63 and 64. The second inputs of these two operational amplifiers are connected to the junction 52 of the voltage divider 45, 48, 49. Connected to the outputs of the operational amplifiers 63 and 64 are respective pulse counters 65 and 66, the stores of which can be compared by a comparator 67. The comparator 67, which is operated by the splice detector 3, controls a format relay 42 in dependence upon the result of the comparator.

The circuit just described operates in the following manner. In conjunction with the arrangement shown in FIG. 1, the voltage appearing at the first, the upper, input of the amplifier 53 is stored in the capacitor 56, the voltage of which is kept at the maximum value occurring during the film strip by its connection through the field effect transistor 57 to the second input of the amplifier 53. This maximum voltage across the capacitor 56 is compared by the comparator 59 with the voltage at the junction 52. When these two voltages are equal, the comparator 59 delivers a pulse which energizes the relay 60 and closes the two relay contacts 60a and 60b. By reason of the resistor 48, a pulse is delivered not only when these two voltages are exactly equal or when the voltage appearing at junction 52 is greater, but also within a certain range of "equality," which range is determined by the resistor 48. It is within this range that the comparator 59 will deliver a pulse, even though the voltage at junction 52, because of variations in grain size distribution in the frame line, or because of noise level, is as much as 3 percent lower than the stored maximum voltage appearing at the other input of the compator 59.

With the contacts 60a and 60b closed, the voltages at the junctions 61 and 62 appear at one of the inputs of the respective operational amplifiers 63 and 64. The amplifiers 63 and 64 can now compare the voltages associated with the frame line (first measurement width) aligned with the photoresistor 45 and the narrow width (second measurement width) of the film strip aligned respectively with the photoresistors 46 and 47. Since these measurement widths are spaced apart distances corresponding to possible frame lengths, that one of the second measurement width which is spaced from the first measurement width an amount corresponding to the format of the film strip, will cause a voltage at the junction 61 or 62 at least approximately equal to that at the junction 52. In other words, this second measurement width must be about as transparent as the first. Either the amplifier 63 or 64 confirms the equality, or approximate equality, of the two signals and delivers the pulse to the corresponding counter 65 or 66. If the position of the photoresistor 46 or 47 is not aligned with a frame line, the transparency of this measurement width is almost certainly less than if it were a frame line, so that even if the comparison is with a maximum signal reduced by a factor corresponding to the noise level, no pulse will be delivered. When the film 2 is advanced sufficiently so that the frame line is moved past the aperture associated with the photoresistor 45, less light falls on the photoresistor 45, the voltage appearing at the lower input is smaller than that appearing at the upper input, of amplifier 59, the relay 60 is deenergized, and the contacts 60a and 60b open. The junction 61 and 62 are disconnected from the amplifiers 63 and 64 until there again appears at the junction 52 a voltage not appreciably smaller than that stored across the capacitor 56. When this is true, the voltages associated with the transparencies of the measurement widths aligned with the photoresistors 46 and 47 are compared with the stored value by the amplifiers 63 and 64, and another pulse is delivered to the appropriate counter 65 or 66.

The counters 65 and 66 are interrogated at the end of the film strip, the format of the strip being that associated with the counter having the largest store. The format relay 42 then delivers a format pulse corresponding to this format.

In accordance with another embodiment of the invention, when the comparator 59 confirms an approximate equality at its two inputs, the voltages at the junction 61 and 62 can be compared with each other, instead of comparing them with the voltage at the junction 52. This comparison also enables the determination of the distance between two consecutive frame lines.

Figure 3:
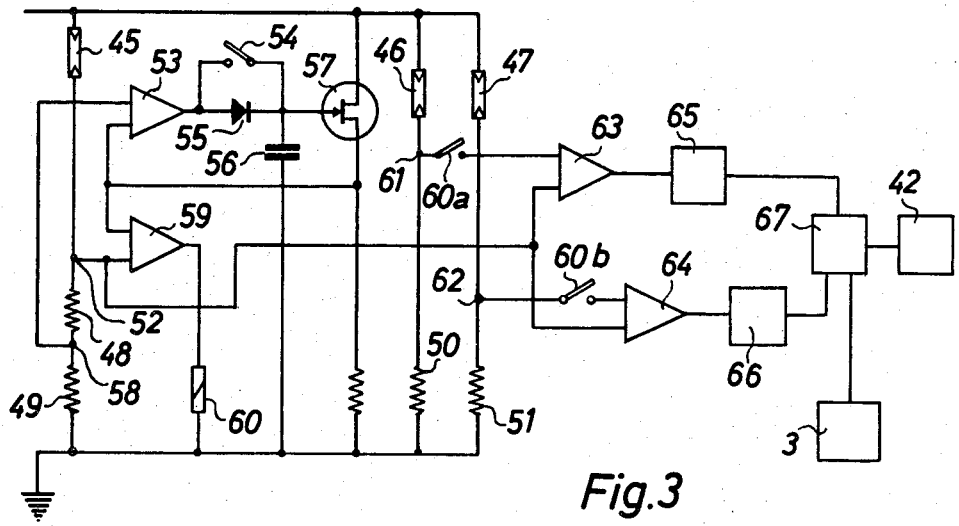
FIGS. 3 and 4 are schematic diagrams of two further embodiments of the invention.
Figure 4:
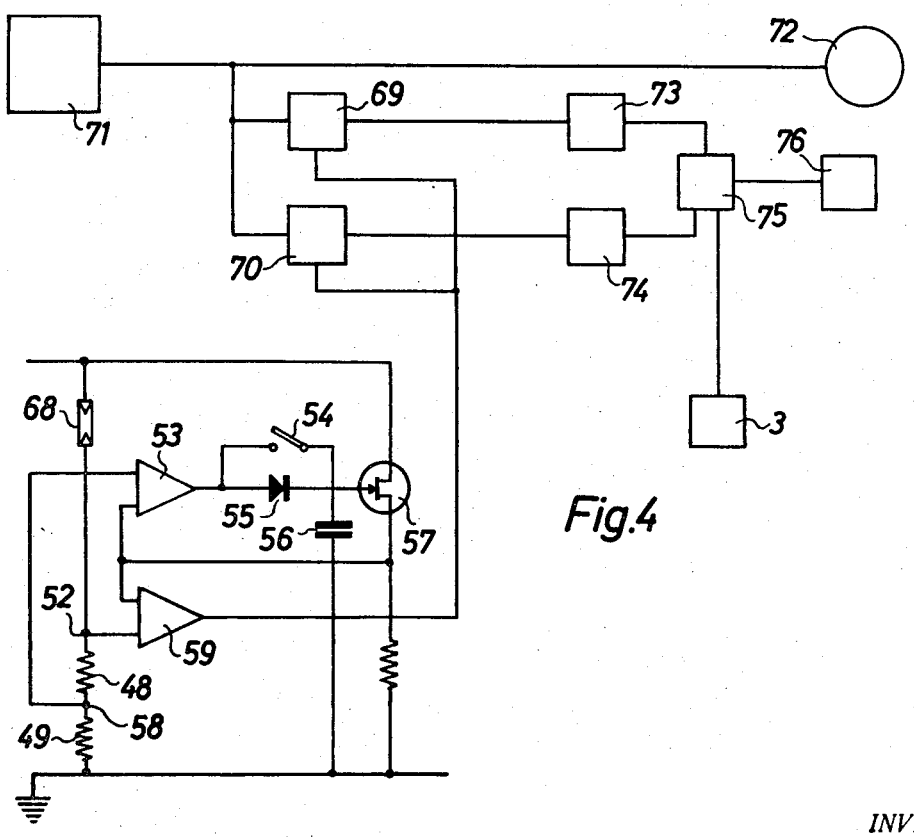

In the embodiment of evaluation circuit shown in FIG. 4, there is only one aperture 5 and one photoresistor 68, which is aligned with this aperture. The lower part of the circuit, connected to the photoresistor 68, is the same in design and operation with that shown in FIG. 3, and its components are denoted by the same reference numerals. The output of the operational amplifier 59 is connected to two counters 69 and 70, which can be reset to zero by the pulse from the amplifier 59. In contradistinction to all of the previous embodiments, the film 2 is advanced stepwise rather than continuously. A pulse generator 71 operates a stepping motor 72, which moves the film 2. Since the size of the steps can be determined with great exactness, the number of steps is an accurate measurement of the distance the film 2 has been advanced. The pulse generator 71 delivers pulses simultaneously to the two parallel-connected counters 69 and 70. The counters 69 and 70 are so designed that, when reset to zero by the pulse from amplifier 59, they deliver a pulse to a respective counter 73 or 74, provided that the number of pulses delivered to the counters 69 or 70 corresponds within determined limits to the format associated with the counters 69 or 70. If the counters 69 or 70 are set to zero when the total pulses delivered to them do not fall within the determined limit for that counter, it does not deliver a pulse. The counter 69 is adjusted to deliver a pulse to counter 73 when the total number of pulses from the generator 71 corresponds to the format 24 × 36 millimeters, whereas the counter 70 delivers a pulse to the counter 74 when the total number of pulses from the generator 71 corresponds to the format 24 × 24 millimeters. The two pulse counters 73 and 74 are interrogated by a comparator 75 operated by the splice detector 3, whereupon the unit 76 delivers format pulse.

The circuit just described operates in the following manner. The pulse generator 71 steps the stepping motor 72. At the same time, the counters 69 and 70 begin from zero with the detection of a new film strip. The varying voltage at the junction 58 corresponds to the varying transparency of the film strip, and the maximum voltage is stored in the capacitor 56. If a new maximum value appears at the junction 52, whereby the voltages at the two inputs of the amplifier 59 are at least approximately equal, the amplifier delivers a pulse and resets both of the counters 69 and 70 to zero; and this new maximum value is stored in the capacitor 46. If the number of pulses from the generator 71 lies within the limits corresponding to a possible frame length, a pulse is delivered to a corresponding counter 73 or 74. If the number of pulses is smaller than the lower limit of the pulse range (frequently the case at the beginning of a film strip), resetting the counters 69 and 70 to zero does not send a pulse to either of the counters 73 or 74. Once several maximum voltages have been recorded, the voltage across the capacitor 56 is raised to the full value of the voltage corresponding to the frame line, and the amplifier 59 delivers a pulse every time the voltages at its inputs are approximately equal, which is virtually only when a frame line passes by the photoresistor 68. The counters 69 and 70 are reset to zero with every pulse from the comparator 59, and thus can be reset several times for a given frame line; but a pulse is delivered to a counter 73 or 74 only at the leading edge of a frame line, since only at that moment has the counter 69 or 70 received the required number of pulses.

When the splice at the rear end of the film strip approaches the splice detector 3, the stores of the counter 73 and 74 are compared by the interrogator 75; and the unit 76 delivers the corresponding format signal. At the same time, the switch 54 is closed, and the capacitor 56 is discharged to that voltage corresponding to the transparency of the film strip aligned with the photoresistor 68 at that moment.

Which of the embodiments described should be used depends upon various factors. The large number of apertures, of the embodiment shown in FIG. 2, creates illumination problems and difficulties in storing the maximum values until the entire film strip has passed through the illuminated film path and been examined. On the other hand, the evaluation circuit is less expensive to construct, whereas a smaller number of apertures 5 requires a more elaborate and expensive evaluation circuit. The embodiments shown in FIGS. 3 and 4 are designed to make a statistical evaluation, so that individual errors occuring during the course of a single film strip, cannot affect the accuracy of the final results.

In accordance with the invention, the evaluation circuit can be altered in a great many ways. It can produce, for example, an autocorrelation function forming an integral of the product of two functions. The resulting function contains a normal error curve of the frame line distribution that can be obtained by certain computer operations.

In the evaluation circuits described in connection with FIGS. 2, 3 and 4, the relays with their normally open contacts can be replaced by semi-conductor components, thereby improving the reliability of the circuit. The circuit diagrams, however, show the more commonly used mechanical relays, with a view to improving the clarity of the circuits. By reversing the polarity of the voltage dividers having the phototransducers, the embodiments described can also be used with film resulting from the development by reversal, the frame lines of which are dark.

It will be understood that each of the elements described above, or two or more together, may also find a useful application in other types of circuits and constructions differing from the types described above.

While the invention has been illustrated and described as embodied in arrangements for determining frame lengths on film strips, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for distinguishing between the lengths of frames on a film strip, wherein the frames are separated by frame lines and wherein said film strip includes frames of at least two different lengths, said arrangement comprising, in combination, means for advancing the film along a predetermined film path; a plurality of phototransducer means arranged on one side of said film path; light producing means arranged on the other side of said film path for generating discrete light beams each substantially having a width not greater than those of the aforementioned frame lines and directing the same at each of the phototransducer means, the latter means transforming the thus received light beams into corresponding frame line voltages, said transducer means including, for each different frame length, a group of at least two phototransducers spaced a distance from each other to correspond to a length of one of the frames, the phototransducers associated with a predetermined frame length receiving light beams substantially concurrently only when a film strip having frame lengths corresponding to said predetermined frame length is interposed between said light producing means and the associated phototransducers; and electrical evaluation means controlled by said frame line voltages and including means for detecting the groups whose transducers receive the light beams substantially concurrently for distinguishing between the frame lengths on said film strip in dependence on said frame line voltages.

2. An arrangement as defined in claim 1, wherein said light producing means comprises a respective group of elongated light sources for each different length of frame, each group comprising at least three light sources, and a discrete phototransducer being aligned with each light source of a group, the phototransducers of the same group being connected in series and transforming light passing through said film strip into signals that include said frame line voltages when said film strip includes frame lengths corresponding to said group.

3. An arrangement as defined in claim 2, wherein said transducers are photoresistors, whereby the photoresistors of that group corresponding to the frame length detected can achieve the lowest series resistance when all the photoresistors of said group receive the light beams substantially concurrently in response to passage of a film frame with which said group is associated.

4. An arrangement for distinguishing between the lengths of frames on a strip, wherein the frames are separated by frame lines and wherein said film strip includes frames of at least two different lengths, said arrangement comprising, in combination, means for advancing the film along a predetermined film path; a single phototransducer means arranged on one side of said film path; light producing means arranged to produce a light beam having substantially a width not greater than those of the aforementioned frame lines and arranged on the other side of said film path for generating a discrete light beam and directing the same at said phototransducer means, the latter transforming the thus received light beam into a corresponding frame line voltage; and electrical evaluation means comprising timing means having pulses associated therewith and controlled by said frame line voltages for distinguishing between the frame lengths on said film strips in dependence on said frame line voltages and the time between two successive frame line pulses.

5. An arrangement for determining the length of frames separated by frame lines on a film strip, including, in combination, means for advancing the film along a predetermined film path; a group of elongated light sources for each different length of frame, each said group comprising at least three light sources with each arranged to produce a light beam substantially having a width not greater than those of the aforementioned frame lines phototransducer means arranged on the other side of said film path opposite said light sources for transforming light passing through said frame lines into corresponding frame line voltages; electric evaluation means controlled by said frame line voltages for determining the frame length on said film strip in dependence on said frame line voltages; a discrete phototransducer means being aligned with each light source of a group, the phototransducer means of the same said group being connected in series and transforming light passing through aid film strip into signal voltages that include said frame line voltages when said film strip includes frame length corresponding to said group; including store means connected to each group of said phototransducer means for storing the maximum voltages of said signal voltages, of which said maximum voltages said frame line voltages usually are the largest; and comparator means for comparing between said groups of phototransducer means the stored maximum voltages to determine the frame line voltage and thereupon for delivering a frame line length signal at the end of said film strip.

6. An arrangement as defined in claim 5, including store preventing means for preventing storage of said maximum voltages when the maximum voltages of said phototransducer means of at least two groups are approximately equal.

7. An arrangement as defined in claim 6, including means operated by the end of said film strip for erasing said store means.

8. An arrangement for determining the length of frames separated by frame lines on a film strip, including, in combination, means for advancing the film along a predetermined film path; at least one light source arranged to produce a light beam having substantially a width not greater than those of the aforementioned frame lines and arranged on one side of and aligned with said film path and extending transversely thereto; phototransducer means arranged on the other side of said film path opposite said light source for transforming light passing through said frame lines into corresponding frame line voltages; electric evaluation means controlled by said frame line voltages for determining the frame length on said film strip in dependence on said frame line voltages; wherein said phototransducer means comprises a first phototransducer and as may further phototransducers as there are different frame lengths to be determined, and an an individual said light source for said first phototransducers and each of said further phototransducers, each of said further phototransducers being spaced from said first phototransducer a distance corresponding to a respective frame length, and all of said phototransducers transforming light passing through said film strip into signal voltages including said frame line voltages; means for storing the maximum voltages of said signal voltages, of which said maximum voltages said frame line voltages usually are the largest; first comparator means for comparing said stored maximum voltages with said signal voltages associated with said first phototransducer; as many pulse generating further comparator means as there are different frame lengths to determine and controlled by said first comparator means to be connected to said further phototransducers to operate whenever the comparison, by said first comparator means, between said stored maximum voltages and said signal voltages shows approximate equality, for comparing signal voltages at locations on said film strip spaced at different possible frame lengths from said first phototransducer.

9. An arrangement as defined in claim 8, wherein said first comparator means connects said further comparator means to respective ones of said further phototransducers and each said further comparator means is connected to receive said signal voltages associated with said first phototransducer, whereby each said further comparator means compares said signal voltages associated with said first phototransducer with the signal voltages associated with a respective one of said further phototransducers to produce a pulse when there is approximate equality between said signal voltages from said first and the respective one of said further phototransducers; and respective counting means connected to each of said further comparator means for counting the pulses therefrom.

10. An arrangement as defined in claim 9, including second comparator means connected to said counter means for comparing the store thereof at the end of said film strip and for causing a frame length signal in dependence on that one of said counter means that has received the greater number of pulses.

11. An arrangement as defined in claim 10, including relay means, operated by said first comparator means when said signal voltages and said stored maximum voltages are approximately equal, and having normally open contacts connected between respective ones of said further phototransducers and said further comparator means.

12. An arrangement for determining the length of frames separated by frame lines on a film strip, including, in combination, means for advancing the film along a predetermined film path; at least one light source arranged to produce a light beam having substantially a width not greater than those of the aforementioned frame lines and arranged on one side of and aligned with said film path and extending transversely thereto; phototransducer means arranged on the other side of said film path opposite said light source for transforming light passing through said frame lines into corresponding frame line voltages; electric evaluation means controlled by said frame line voltages for determining the frame length on said film strip in dependence on said frame line voltages; wherein said phototransducer means transforms the light passing through said film strip into signal voltages of which said frame line voltages are usually the maximum, and including means for storing the maximum voltages of said signal voltages; timing means for generating successive pulses; first counter means for each frame format to be determined connected to said timing means and arranged to receive said pulses as well as reset-to-zero pulses, and for delivering a further pulse upon being reset-to-zero wherever the interval between successive reset to zero pulses corresponds to the frame length of a respective counter means; comparator means for comparing said stored maximum voltages with said signal voltages and for delivering a reset to zero pulse to said first counter means whenever there is approximate equality; timing means for determining the interval between successive said pulses.

13. An arrangement as defined in claim 12, including a respective second counter means connected to each of said first counter means for receiving said further pulses therefrom; and means for interrogating said second counter means at the end of said film strip.

14. An arrangement as defined in claim 13, including format pulse means for delivering a format pulse in dependence on the interrogation of said second counter means showing which of the latter has received the greatest number of pulses, whereby said means for storing the maximum voltages is erased.

15. An arrangement as defined in claim 12, wherein said timing means is a pulse generator.

16. An arrangement for determining the length of frames separated by frame lines on a film strip, including, in combination, means for advancing the film along a predetermined film path; at least one light source arranged to produce a light beam having substantially a width not greater than those of the aforementioned frame lines and arranged on one side of and aligned with said film path and extending transversely thereto; phototransducer means arranged on the other side of said film path opposite said light source for transforming light passing through said frame lines into corresponding frame line voltages; electric evaluation means controlled by said frame line voltages for determining the frame length on said film strip in dependence on said frame line voltages; including engaging means for positively engaging said film strip located downstream of said light source; film strip splice detector means located upstream of said light source for releasing said engaging means; and slack compensating means located between said light source and engaging means for taking up the length of a film strip.

17. An arrangement for determining the length of frames separated by frame lines on a film strip, including, in combination, means for advancing the film along a predetermined film path; at least one light source arranged to produce a light beam having substantially a width not greater than those of the aforementioned frame lines and arranged on one side of and aligned with said film path and extending transversely thereto; phototransducer means arranged on the other side of said film path opposite said light source for transforming light passing through said frame lines into corresponding frame line voltages; electric evaluation means controlled by said frame line voltages for determining the frame length on said film strip in dependence on said frame line voltages; including engaging means for positively engaging said film strip; and marking means located next to said engaging means for marking, in dependence on said frame length voltage, said film strip near the forward end thereof with a format mark that can be detected.

18. An arrangement for determining the length of frames separated by frame lines on a film strip, including, in combination, means for advancing the film along a predetermined film path; at least one light source arranged to produce a light beam having substantially a width not greater than those of the aforementioned frame lines and arranged on one side of and aligned with said film path and extending transversely thereto; phototransducer means arranged on the other side of said film path opposite said light source for transforming light passing through said frame lines into corresponding frame line voltages; electric evaluation means controlled by said frame line voltages for determining the frame length on said film strip in dependence on said frame line voltages; including automatic notching means connected to said evaluation means to notch said film strip in dependence on the frame length.

* * * * *